United States Patent [19]

Shankle et al.

[11] 4,398,057

[45] Aug. 9, 1983

[54] ARC PROTECTION ARRANGEMENT FOR COVERED OVERHEAD POWER DISTRIBUTION LINES

[75] Inventors: Derrill F. Shankle, Whitewall Borough; Jeffrey L. Maitlen, Forest Hills, both of Pa.

[73] Assignee: Westinghouse Electric Corp., Pittsburgh, Pa.

[21] Appl. No.: 248,789

[22] Filed: Mar. 30, 1981

[51] Int. Cl.$^3$ .......................... H02H 1/04; H02G 7/00

[52] U.S. Cl. .................................... 174/2; 174/40 R; 361/117

[58] Field of Search ..................... 174/2, 40 R, 43, 44, 174/71 R, 127, 135, 140 R, 144; 361/1, 107, 117, 131, 132; 24/135 R, 135 K; 339/263 R, 263 L, 265 R, 265 F

[56] References Cited

U.S. PATENT DOCUMENTS 2,956,104 10/1960 Bither .................................... 174/44
3,046,327 7/1962 Harmon ........................... 174/127 X
3,522,365 7/1970 Dannes ......................... 174/71 R X
3,773,967 11/1973 Sturm ............................. 174/127 X

FOREIGN PATENT DOCUMENTS 879234 11/1942 France ................................ 174/144

*Primary Examiner*—Laramie E. Askin
*Attorney, Agent, or Firm*—John L. DeAngelis, Jr.

[57] ABSTRACT

A covered distribution wire is provided with a clamp device having sufficient mass to provide conductor protection against damage from fault current arcs over a section of the conductor where the insulation cover is removed for interconnection or insulator support purposes. The clamp mass is at least a minimum value needed for practicality in usage and otherwise is based on the fault energy to be absorbed from fault arcs in the expected usage.

4 Claims, 6 Drawing Figures

RADIAL SYSTEM

LOOP SYSTEM

ARC PROTECTION ARRANGEMENT FOR COVERED OVERHEAD POWER DISTRIBUTION LINES

CROSS REFERENCE TO RELATED APPLICATIONS

U.S. patent application Ser. No. 248,788 entitled "Improved Arc Protection Clamp And Arrangement For Covered Overhead Power Distribution Lines" filed by Paul H. Stiller concurrently herewith.

BACKGROUND OF THE INVENTION

The present invention relates to arc protection for power distribution lines and more particularly to structured arrangements employed to protect covered overhead power distribution lines against damage from fault current arcing.

Electric power distribution lines are normally classed as those which operate at 34 kV or less line to line, but usually no lower than 4 kV line to line. Overhead distribution conductors are insulated from ground using stand-off or string insulators on support poles. Adequate insulation from ground is achieved without covering the conductors with an insulating material. Bare distribution conductors are in use throughout the United States.

A significant percentage of installed power distribution lines are provided with conductors having an insulation covering which reduces hazards to life and property near or close to the lines. Covered conductors also provide certain other advantages over bare conductor circuits. For example, momentary tree contact is less likely to fault a covered conductor than a bare conductor. Momentary phase-to-phase contact caused by wind deflection will fault a bare conductor circuit, while a covered conductor circuit would not be affected under the same circumstances.

Covered distribution conductors can and often do create system maintenance problems as a result of conductor damage caused by lightning induced fault currents. Thus, experience has shown that covered conductors burn down more frequently than bare conductors. A fallen overhead phase conductor can cause a high impedance fault on distribution circuits, such as when a phase conductor falls, without contacting another phase or neutral conductor, and comes to rest on an asphalt or other high impedance surface. The resulting fault current magnitude is sometimes not sufficient to cause operation of the overcurrent protection equipment. In addition to interrupting customer service, the undetected live wire is a threat to public safety and a fire hazard.

Lightning may strike an overhead distribution conductor anywhere along its length and it can and often does arc to another conductor at a weak point. The most probable arcing occurs with common vertical lines with current flowing between the top phase conductor and the neutral conductor. Some problem exists for flashover from the top conductor to another phase conductor, sometimes involving all phases and the neutral.

Lightning can initiate power frequency fault current by ionizing a small path of gas between the conductors. This often occurs where the conductors have their insulation stripped back for necessary interconnections or attachment to support insulators.

The magnitude of the power frequency fault current is a function of the line voltage, the circuit impedance and other system parameters. Secondary functions such as arc bending winds and humidity also affect the fault current magnitude.

The fault current duration depends on the speed with which circuit interrupters function to open the faulted circuit. Conductor damage at the point of arcing varies in accordance with the conductor temperatures produced by fault current heat which depends in turn on the magnitude and duration of the fault current. Often, a single arc event is sufficient to melt enough conductor metal to cause the conductor to lose its needed tensile strength. It then falls to the ground as a result of a structural failure. In other cases, it may require two or three arc faults at the same point over a period of 20 or 30 years to produce a line failure. Failure can also occur some time after damage by normal load current heating because of the reduced current carrying capability resulting from the arc damage.

When an overhead conductor in a multi-grounded neutral distribution system breaks and falls to the ground without simultaneously contacting the multi-grounded neutral conductor, there is a significant probability of it coming to rest on a high-impedance surface, such as concrete, asphalt or dry earth. As previously indicated, the resulting fault current may not be sufficient to cause operation of the overcurrent protection equipment. The problem is further aggravated by the use of covered phase conductors which may increase the fault impedance and further reduce the fault current magnitude. In addition to interrupting customer service, the undetected live wire is a threat to public safety and a fire hazard.

Clearly, if reliability and safety advantages are to be gained from the use of covered distribution lines as opposed to uncovered lines, conductor arc damage needs to be avoided where conductors are stripped of insulation for interconnection or support. Thus, covered conductors need to be protected against burndown to be more reliable and safer than comparable bare conductor circuits.

Arrangements have been employed in the past to prevent corona on power lines. Corona does not normally damage conductor metal but it does produce television and radio interference.

A representative clamp type device for corona prevention is shown in U.S. Pat. No. 3,773,967 issued to R. Sturm. Another clamp type device is shown in U.S. Pat. No. 3,046,327, issued to R. Harmon. In the U.S. Pat. No. 3,046,327 patent, the clamp device is bridged across a portion of the bare conductor and an adjacent conductor portion strengthened with an armor covering.

Neither this art nor other known prior art is addressed to the need for protection against fault arc burndown of covered power conductors.

SUMMARY OF THE INVENTION

A protection arrangement for covered power conductors includes a metallic clamp which engages the metallic conductor at or near the end face of the insulation covering. The clamp is preferably made of the same metal as the conductor and further is structurally featured and provided with sufficient mass to provide long term heat sink protection against arc damage as well as to provide for maintenance ease.

DESCRIPTION OF THE PREFERRED EMBODIMENTS

Figure 1:
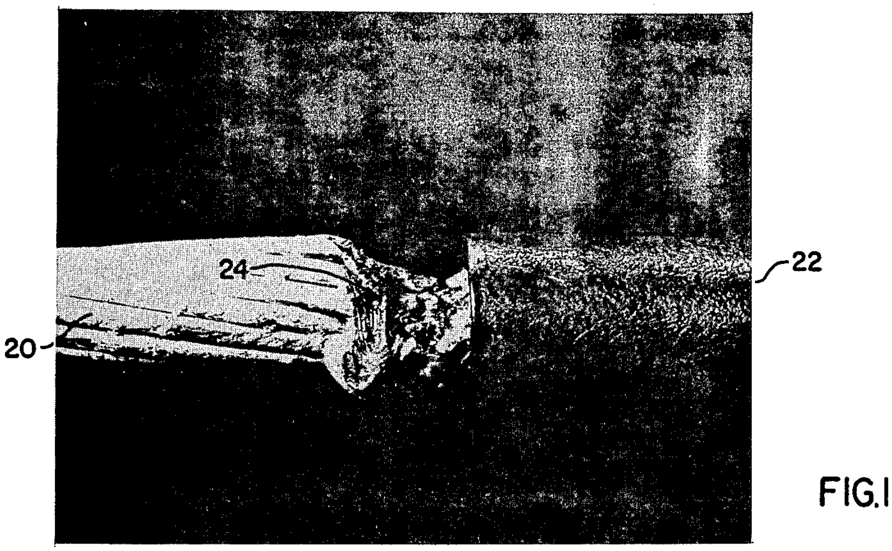
FIG. 1 shows a covered conductor having typical arc damage which can lead to a fallen line.

More particularly, there is shown in FIG. 1 a power system conductor 20 commonly manufactured from aluminum and having a polyethylene or other suitable insulation covering 22 and having a portion 24 thereof burned down as a result of the heat generated by one or more arcs produced by distribution circuit fault current. It is desirable to avoid arc damage like that at the portion 24 since conductor breakage can occur to produce a hazardous condition and a power interruption.

The basic mechanism involved in conductor burndown involves stationary arc termini which focus energy on a small portion of conductor surface. The most common conditions which can force an arc terminus to remain stationary are arc cover punctures and cover stripping provided for conductor connection or support.

Essentially all direct lightning strokes puncture the phase-conductor covering and arc to the multigrounded neutral conductor which is typically bare. The surge is more likely to cause flashover to the neutral at or near a point where it is grounded rather than at the mid-span point because of mutual coupling, which raises the neutral potential except near grounds where the neutral is held close to ground potential. Thus, the greatest phase-to-neutral potential occurs at neutral ground points.

Impulse puncture of a phase conductor and arcing to the bare neutral conductor initiates a fault on the distribution circuit. Power follow current tends to enlarge the cover puncture hole and damage the aluminum phase conductor. Typical evidence of impulse puncture and subsequent power follow current is a clean hole in the conductor covering 5 to 10 mm. in diameter, with phase conductor metal melted away. The neutral conductor shows no sign of damage as the arc moves on the neutral due to motoring action. Further, field data indicate that burndowns are frequently located near points where the neutral conductor is grounded. These indications lead to the conclusion that breakdown of the conductor cover is primarily by impulse puncture.

Cover punctures can also be caused by surface leakage current or partial discharge erosion. Since the present invention is addressed to conductor burndown, no further consideration is given to cover punctures herein.

Partial stripping is intentional and it provides access to the conductor for electrical or support connections. For example, at support insulators, a section of covering is stripped away. The bare section is then centered on the support insulator, allowing direct electrical contact between the conductor, tie wire, and insulator.

An arc terminating in the stripped region of the phase conductor motors away from the source, due to magnetic forces, and dwells at the edge of the covering. The conductor covering effectively restrains the arc terminus and focuses energy on a small portion of conductor.

Damage to the conductor can include loss of original tensile strength by annealing and/or melting of conductor material, either of which can result in burndown.

Conventional overcurrent protection with a high continuous current rating may not prevent burndown of covered conductors. Damage may occur long before the circuit can be deenergized by conventional means.

Figure 2:
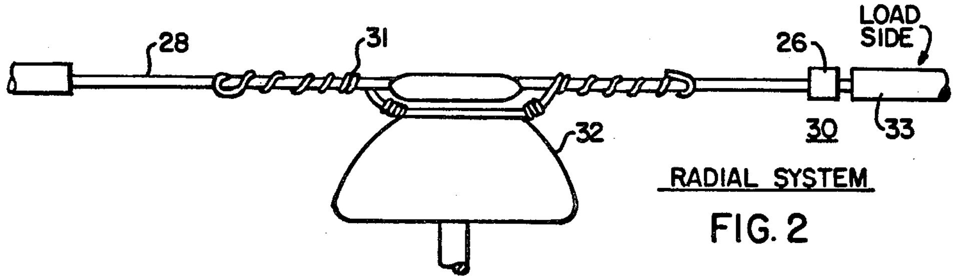
FIG. 2 shows an arrangement for protecting insulated power lines from arc damage in accordance with the principles of the invention.
Figure 4:
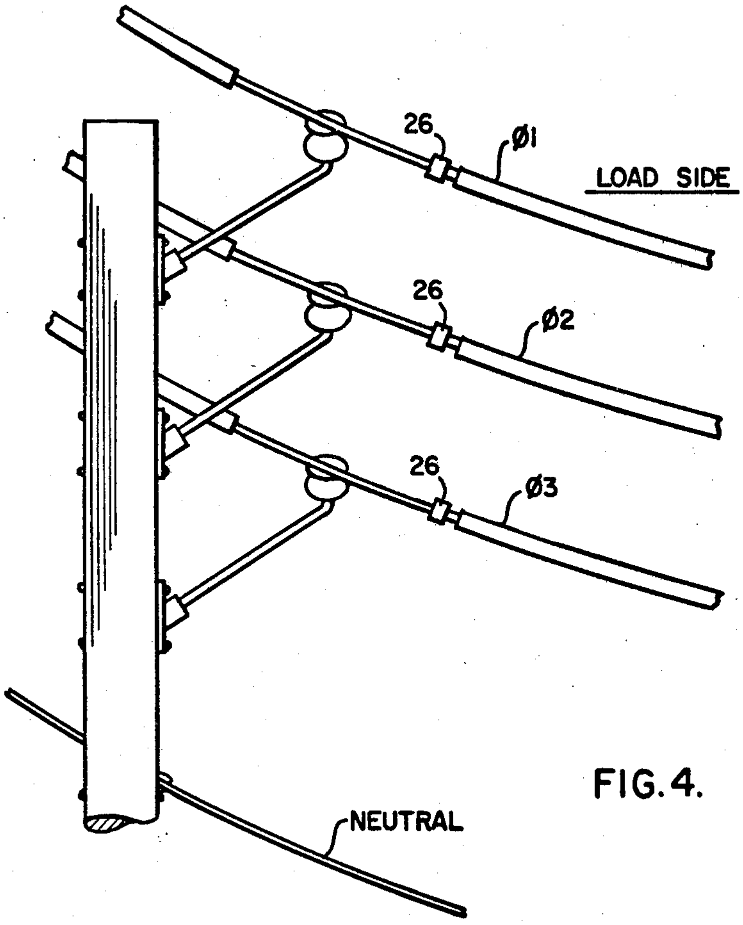
FIG. 4 shows the invention arrangement as applied to all three phases of a 3-phase distribution system.

FIG. 2 shows a typical configuration for support of single-phase distribution line 30, i.e., the phase conductor is tied by ties 31 to support insulator 32 spaced along the line length. A multi-grounded neutral conductor (not shown) is clamped to the support pole at some distance below the phase conductor. For two-phase or three-phase lines, this configuration is modified by use of a wooden crossarm or fiberglass brackets as shown in FIG. 4. As shown in FIG. 2, when using covered conductors for overhead distribution lines, the conductor cover is stripped by some electric power companies in the vicinity of the support insulator.

Flashover of the insulator 32 due to lightning often leads to a power follow arc which travels along the stripped portion of the conductor to the insulation cover termination where it dwells. If the line-to-ground fault is not cleared in a sufficiently short period of time, the distribution conductor is damaged or severed and may fall to the ground.

To protect against conductor arc burndown, a clamp device 26 is secured to conductor 28 near a stripped end of an insulation covering 33 as shown in FIG. 2. Generally, one or two clamps 26 are preferably installed at each conductor section from which insulation has been stripped. The protection provided by the clamp 26 results from its functioning as an arc terminus and a heat sink until circuit interruption devices have time to operate.

The following objectives are realized with the way in which the conductor burndown protection arrangement including the clamp is structured:

- Installation ease
- Little or no maintenance
- Impervious to weather
- Ease of service after arcing (removable)
- Durable (indefinite) electrical connection to conductor
- Eliminate loss of conductor tensile strength due to annealing or cold flow reduction in diameter as a result of arc protection functioning by the clamp.

Figure 5:
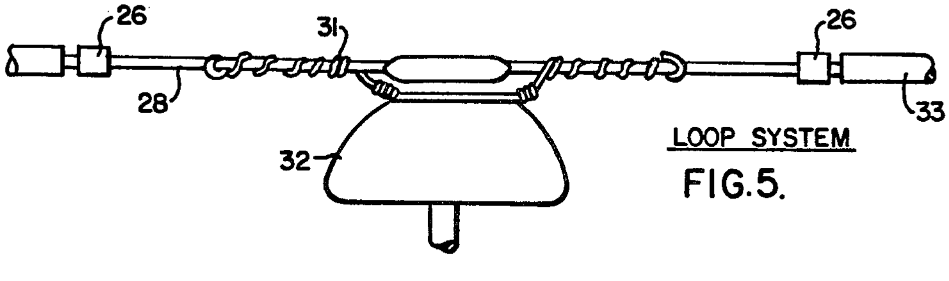
FIG. 5 shows a variation of the arrangement as applied to a loop distribution system.

The clamp 26 is a two part preferably generally cylindrical member which is structured to satisfy the described performance objectives. Because of the direction of possible arc motoring, the clamp 26 is preferably placed on the load side of the support insulator in radial distribution systems (FIG. 2) and on both sides of the support insulation in looped distribution systems (FIG. 5).

Stripping away the cover reduces the impulse strength of the circuit at the poles and provides a highly probable lightning flashover path. Any resulting power follow arc that does not self-extinguish tends to motor away from the source and dwell on the clamp device 26. Conventional overcurrent protection equipment then clears the fault before damage occurs to the phase conductor(s).

The basic function of the clamp device 26 is to add metallic heat sink mass at the appropriate location on the distribution conductor to alter favorably the thermal response of the conductor to arcing. The device 26 is structured and placed on the conductor so as to (1) shroud the conductor and function as an arc terminus near the end of the conductor cover and (2) to limit the temperature of the conductor so as to prevent reduction in tensile strength or a significant increase in electrical resistance of the conductor.

Figure 3A:
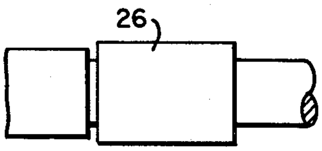
FIG. 3A shows a side elevational view of an embodiment of the invention in which the clamp is secured to the conductor by crimping.
Figure 3B:
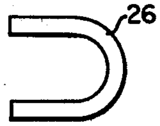
FIG. 3B shows an end view of the FIG. 3A clamp prior to crimping.

It is presently preferred that a removable bolt type of clamp device be employed for burndown protection. An alternative embodiment shown in FIGS. 3A and 3B is a generally C-shaped crimping type clamp. Thus, portions are crimped together by a suitable tool after the clamp is placed in the desired position along the conductor.

What is claimed is:

1. An arrangement for protecting an overhead power distribution line having an insulation cover against damage from fault current arcing, said arrangement comprising a portion of the line having a section of its insulation cover removed to form an insulation cover end face and to expose a section of the line conductor for interconnection or support, and a conductive arc protection clamp device secured in conductive contact with said conductor section and having substantial heat sink mass to provide sufficient arc energy absorption for line conductor protection, said clamp device having at least a portion thereof substantially surrounding and shielding said conductor section to function as an arc terminus.

2. An arrangement as set forth in claim 1 wherein the line is connected in a radial distribution system, said conductive arc protection clamp device is the only arc protection clamp member clamped on said conductor section and it is clamped on said conductor section on the load side of said conductor section to function as an arc terminus.

3. An arrangement as set forth in claim 1 wherein the line is connected in a loop system, said arc protection clamp device being clamped on said conductor section at one end of said conductor section to function as an arc terminus, and a second similar arc protection clamp device clamped on said conductor section at the other end of said conductor section to function as an arc terminus.

4. An arrangement as set forth in claim 1 wherein said arc protection clamp device is a generally elongated C-shaped member prior to installation in its arc-protection position on said conductor section, and crimpable portions are provided on said member to enable said member to be crimped around and into conductive relationship with said conductor thereby shrouding said conductor section and operating as an arc terminus.

* * * * *